3,288,733
POLYURETHANES PREPARED FROM OXY-ALKYLATED CYANOGUANIDINE
Donald W. Kaiser, Hamden, Conn., assignor to Olin Mathieson Chemical Corporation, a corporation of Virginia
No Drawing. Original application May 1, 1963, Ser. No. 277,123, now Patent No. 3,262,941. Divided and this application Oct. 18, 1965, Ser. No. 510,425
4 Claims. (Cl. 260—2.5)

The present invention relates to a novel process for oxyalkylating cyanoguanidine.

The present application is a division of co-pending application, Serial No. 277,123, filed May 1, 1963, now U.S. Patent 3,262,941 by Donald W. Kaiser.

Cyanoguanidine has previously been oxyethylated, for example as described in U.S. Patents 2,349,557 and 2,375,012 by heating it under pressure with ethylene oxide and water but with no catalyst. Several hours at temperatures to 125° C. were required to combine 2 molecules of ethylene oxide with one of cyanoguanidine.

It has been found, surprisingly and unexpectedly, that cyanoguanidine reacts readily with propylene oxide in the presence of a solvent containing dimethyl sulfoxide in an amount of from 5 to 100 percent by weight of the total solvent portion. The reaction is conducted at atmospheric pressure in the presence of a basic catalyst, at a temperature of between about 75 and 175° C. and the ratio of cyanoguanidine to alkylene oxide is from 1:5 to 1:125. The reactants are mixed in the desired proportions at the desired temperature and in the presence of a basic catalyst.

In the present specification and claims the term alkylene oxide is intended to include alkylene oxides having 3 to 8 carbon atoms, including alkylene oxides containing non-interferring substituents and aralkylene oxides, for example, styrene oxide. The unsubstituted alkylene oxides, especially the lower alkylene oxides are preferred, for example, propylene oxide, butylene oxide, isobutylene oxide and n-hexyl oxide. The cycloalkylene oxides may also be used, for example, cyclobutylene oxide and cyclohexylene oxide.

The reaction is accelerated by employing elevated temperatures from 75 to 175° C. and preferably from 90° to 140° C. and by the use of a basic catalyst, either organic or inorganic. The catalyst is preferably an alkali metal hydroxide or alkoxide, for example, sodium hydroxide, potassium hydroxide or sodium methoxide. The reaction is initially exothermic and conventional cooling means are normally employed to maintain the reaction at the desired temperature. The reaction time is not critical and will vary depending upon the degree of completion desired, temperature, reactants and proportions.

The molar ratio of the cyanoguanidine to alkylene oxide may vary from 1:5 to 1:125. Thus oxyalkylated products can be tailormade for particular properties depending upon the proportion of alkylene oxide employed. The properties of the resultant product depends on the character of the substituents and the proportion of alkylene oxide employed.

The reaction is conducted in a solvent containing dimethyl sulfoxide in an amount of from 5 to 100 percent by weight of the solvent portion. It is a surprising feature of the present invention that when at least a portion of the solvent component is dimethyl sulfoxide, the cyanoguanidine is readily oxyalkylated. The total solvent component may consist of the dimethyl sulfoxide, or for economy, varying amounts of less expensive and convenient solvents may be employed, such as toluene, xylene, dioxane, etc.

The minimum proportion of dimethyl sulfoxide used is suitably sufficient to dissolve at least a portion of the cyanoguanidine. As the oxyalkylation proceeds, the remaining cyanoguanidine dissolves in the reaction mixture. Preferably the weight ratio of cyanoguanidine to dimethyl sulfoxide in the solvent is from 1:1 to 1:5. Larger proportions of dimethyl sulfoxide are not deleterious but only increase the amounts subsequently to be removed.

The oxyalkylated products are recovered from the reaction mixture by conventional methods, for example, addition of acid to the mixture to neutralize the basic catalyst plus the basicity of the resultant polyol, distillation of excess solvent and recovery of the product by filtration. The acid used for neutralization of the catalyst is suitably inorganic, for example, monoammonium phosphate, phosphoric, hydrochloric, sulfuric or sulfamic acid. It may also be organic, for example, acetic, trichloroacetic, oleic or linoleic acid. Tall oil is especially advantageous. The cyanoguanidine can be partially oxyalkylated, solvent removed by distillation, and oxyalkylation continued. The final pH is suitably 4 to 12.

Cyanoguanidine is essentially a neutral compound, with dissociation constants of:

$$K_a\ 25°\ C.=6\times10^{-15}$$
$$K_b\ 0°\ C.=3\times10^{-15}$$

However, the alkoxylated products are strongly basic. It is believed that propylene oxide, for example, reacts in the following fashion to create a strong base, which is then further oxypropylated:

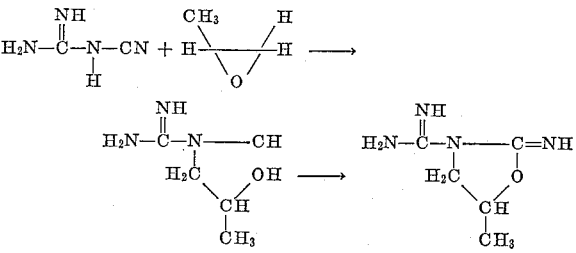

This invention is not limited, however, to the above interpretation.

With the creating of a strong base, excess acid over that required to neutralize the basic catalyst is required to lower the pH of the resultant polyol. Since mineral acids and tall oil are cheap, an unexpected advantage is accrued and the cost of the polyol product is appreciably cheapened.

The "apparent pH," as this term is used in the present specification, including the examples, is determined by measuring the pH of a solution of 10 grams of the sample in 50 ml. of a mixture of 10 parts by volume of isopropanol and 6 parts of water.

The utilization of dimethyl sulfoxide as solvent offers several significant and unexpected advantages in the preparation of oxyalkylated cyanoguanidine. The use of a solvent comprising dimethyl sulfoxide allows the convenient use of lower reaction temperature and shortens the reaction time. In addition, no pressure is required.

The oxyalkylated products of the present invention have highly desirable characteristics as the polyol component in flexible, rigid and semi-rigid polyurethane films and foams. The foam compositions are formed by reaction of a diisocyanate in the presence of a foaming agent and catalyst, with the oxyalkylation products of the present invention. The resultant polyurethane foams are characterized by greatly improved flame retardance, due to the presence of nitrogen and a mineral acid. They also have excellent humid aging properties and hydrolytic stability. In addition, the oxyalkylated products of the present invention may be used as anti-corrosion agents when $H_3PO_4$ is the acid of neutralization and as dispersants for lubricating oils, plasticizers or stabilizers for poly(vinyl chloride) resins, epoxy resin curing agents, and reactants for the preparation of polyester resins. The salts, such as the phosphates, are water soluble and may be utilized as cationic detergents and softening agents for cotton.

Suitable organic polyisocyanates which may be employed in the preparation of the polyurethane foams include di-isocyanates, tri-isocyanates, and polyisocyanates. Especially preferred are mixed isomers of toluylene di-isocyanate which are readily available commercially. Other suitable isocyanates include methylene-bis-(4-phenyl isocyanate), 3,3'-bitolylene-4,4'-di-isocyanate, 3, 3'-dimethoxy-4,4'-bi-phenylene di-isocyanate, naphthalene-1, 4-diisocyanate, hexamethylene di-isocyanate, PAPI(polymethylene polyphenyl isocyanate) and 1,4-phenylene di-isocyanate. The amount of isocyanate employed in the preparation of the polyurethane foams should be sufficient to provide at least 0.7 NCO groups based on the number of hydroxyl groups present in the alkoxylated cyanoguanidine of the present invention, the number of hydroxyl groups in any additive employed and the number of hydroxyl groups employed in the foaming agent. An excess of isocyanate compound may be conveniently employed; however, this is generally undesirable due to the high cost of the isocyanate compounds. It is preferable, therefore, to employ no greater than 1.5 NCO groups based on the number of hydroxyl groups and preferably between about 0.9 and 1.1 NCO groups.

Pre-polymers can be formed from the polyols of the present invention by reaction with a suitable excess of a di-isocyanate. The proportion of di-isocyanate in these prepolymers is suitable to provide from 1.4 to 3.0 NCO groups per hydroxyl group. The prepolymers are subsequently reacted with additional polyol with or without additional di-isocyanate in applications where the use of pre-polymers is advantageous.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include but are not limited to, the following: monofluorotrichloromethane, difluorodichloromethane, 1,1,2 - trichloro-1,2,2 - trifluoroethane, methylene chloride, chloroform and carbon tetrachloride. The amount of foaming agent employed may be varied within a wide range. Generally however, the halogenated hydrocarbons are employed in an amount of from 1 to 50 parts by weight per 100 parts by weight of the adduct of the present invention, and generally the water, when employed, is in an amount of from 0.1 to 10 parts by weight per 100 parts by weight of the adduct of the present invention.

The polyurethane foams are prepared in the presence of a catalytic amount of a reaction catalyst. The catalyst employed may be any of the catalysts known to be useful for this purpose, including tertiary amines and metallic salts. Suitable tertiary amines include N-methyl morpholine, N-hydroxyethyl morpholine, triethylene diamine, triethylamine, trimethylamine and N,N-dimethylethanolamine. Typical metallic salts include, for example, the salts of antimony, tin and iron, for example, dibutyltin dilaurate and stannous octoate. The catalyst is usually employed in an amount of from 0.1 to 2.0 percent by weight based on the coalkoxylation product of the present invention.

In the preparation of the polyurethane foams of the present invention minor amounts of emulsifier are preferably used to improve the cell structure of the polyurethane foam. Typical of such emulsifiers are the silicone oils and soaps. Generally up to 2 parts by weight of the surfactant is employed per 100 parts of polyol.

Various additives can be employed which serve to provide different properties, e.g. fillers, such as clay, calcium carbonate or calcium sulfate. These additives lower the cost and improve physical properties. Dyes may be added for color, and fibrous glass, asbestos, or synthetic fibers may be added for strength. In addition, plasticizers, deodorants and anti-oxidants may be added.

Example I

A stirred mixture of 84 g. (1.0 mole) of cyanoguanidine, 3.5 g. of 85 percent potassium hydroxide and 150 ml. (160 g.) of dimethyl sulfoxide was heated under nitrogen to 100° C. and propylene oxide was gradually added to the solution. Reaction was initially exothermic. A total of 421 g. (7.25 moles) of propylene oxide was reacted.

After propoxylation, 5.24 g. of 50 percent sulfuric acid was added to neutralize the potassium hydroxide. An additional 190 g. of 50 percent sulfuric acid was then required to lower the pH. Attapulgus clay (30 g.) was added and the mixture was stripped at 100 to 110° C. under water pump vacuum for 4 hours. The hot mixture was filtered through Celite covered paper and stripping was continued at 1 to 2 mm. with a final temperature of 150° C. Analysis of the product gave the following values:

| | |
|---|---:|
| Hydroxyl number | 368 |
| Acid number | 12.69 |
| Percent water | 0.12 |
| Apparent pH | 4.1 |
| Viscosity 100° F., centistokes | 104,706 |

Example II

Propylene oxide was gradually added to a stirred solution of 168 g. (2.0 moles) of cyanoguanidine and 8 g. of 85 percent potassium hydroxide in 200 ml. (220 g.) of dimethyl sulfoxide heated to 100° C. under nitrogen. A total of 580 g. (10 moles) of propylene oxide was reacted. When cool, the potassium hydroxide was neutralized with 7 g. of 85 percent phosphoric acid. The high alkalinity of the polyol was neutralized with 1208 g. of Unitol DT (tall oil). Attapulgus clay (75 g.) was added and the mixture stripped 2 hours at 126° C. under water pump vacuum. The mixture was filtered through a Celite covered filter paper. The filtrate was stripped further at 150° C. and at 1 to 2 mm. Analysis gave the following values:

| | |
|---|---:|
| Hydroxyl number | 168 |
| Alkaline number | 2.86 |
| Percent, water | 0.03 |
| Apparent pH | 11.5 |
| Viscosity 100° F., centistokes | 775 |

Example III

A stirred mixture of 168 g. (2.0 moles) of cyanoguanidine and 8 g. of 85 percent potassium hydroxide in 200 ml. (220 g.) of dimethyl sulfoxide was heated to 70° C. under an atmosphere of nitrogen. Propoxylation was carried out at 70° C., introducing 380 g. of propylene oxide. The temperature was increased to 85° C. and propoxylation was completed. A total of 580 g. (10 moles) of propylene oxide reacted. The catalyst was neutralized with 7 g. of 85 percent phosphoric acid. The addition of 604 g. of tall oil (Unitol DT) was followed by treatment with 75 g. of Attaclay at 75° C. under 30 to 30 mm. pressure for 1 hour. The mixture was filtered through Celite and stripped at 150° C. at a pressure below 1 mm. Analyses gave the following values:

| | |
|---|---:|
| Hydroxyl number | 270 |
| Alkaline number | 5.52 |
| Water, percent | 0.04 |
| Apparent pH | 12.1 |
| Viscosity at 100° F., centistokes | 918 |

A polyurethane foam was prepared using the following formulation:

| Component: | Parts by weight |
|---|---|
| Polyol of Example III | 100 |
| Emulsifier (silicone) | 1.3 |
| Catalyst (1,2,4-trimethyl-piperazine) | 0.2 |
| Foaming agent (Freon 11)* | 20 |
| Tolylene di-isocyanate | 45 |

* Freon 11 is a trademark of E. I. du Pont de Nemours and Company, Inc., for its brand of trichloromonofluoromethane.

What is claimed is:

1. The process of preparing a polyurethane which comprises admixing (A) an organic polyisocyanate, (B) 0.1 to 2 parts of a reaction catalyst per 100 parts of (C) a liquid reaction product formed by admixing (1) a basic catalyst, (2) cyanoguanidine and (3) dimethyl sulfoxide to form a liquid reaction mixture, the weight ratio of (2) to (3) being between 1:1 and 1:5, heating said liquid reaction mixture to a temperature between 75° and 175° C. while passing into said liquid reaction mixture an alkylene oxide having 3 to 8 carbon atoms, the weight ratio of (2) to said alkylene oxide being between 1:5 and 1:125 and then removing said dimethyl sulfoxide, the proportion of (A) providing 0.7 to 1.5 CNO groups for each hydroxyl group contained in (C).

2. The process of preparing a polyurethane foam which comprises admixing (A) an organic polyisocyanate, (B) 1 to 50 parts of a foaming agent, (C) 0.1 to 2 parts of reaction catalyst per 100 parts of (D) a liquid reaction product formed by admixing (1) a basic catalyst, (2) cyanoguanidine and (3) dimethyl sulfoxide to form a liquid reaction mixture, the weight ratio of (2) to (3) being between 1:1 and 1:5, heating said liquid reaction mixture to a temperature between 75° and 175° C. while passing into said liquid reaction mixture an alkylene oxide having 3 to 8 carbon atoms, the weight ratio of (2) to said alkylene oxide being between 1:5 and 1:125 and then removing said dimethyl sulfoxide, the proportion of (A) providing from 0.7 to 1.5 CNO groups for each hydroxyl group contained in (D).

3. The polyurethane produced by the process of claim 1.

4. The polyurethane foam produced by the process of claim 2.

No references cited.

LEON J. BERCOVITZ, *Primary Examiner.*

DONALD E. CZAJA, *Examiner.*